US011093870B2

United States Patent
Wilde et al.

(10) Patent No.: US 11,093,870 B2
(45) Date of Patent: Aug. 17, 2021

(54) SUGGESTING PEOPLE QUALIFIED TO PROVIDE ASSISTANCE WITH REGARD TO AN ISSUE IDENTIFIED IN A FILE

(71) Applicant: MICROSOFT TECHNOLOGY LICENSING, LLC, Redmond, WA (US)

(72) Inventors: Benjamin Gustav Wilde, Quincy, MA (US); Patrick Michael Gan, Salem, MA (US); Douglas Lane Milvaney, Somerville, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 426 days.

(21) Appl. No.: 15/893,510

(22) Filed: Feb. 9, 2018

(65) Prior Publication Data
US 2019/0251493 A1 Aug. 15, 2019

(51) Int. Cl.
*G06Q 10/06* (2012.01)
*G06Q 50/00* (2012.01)
(Continued)

(52) U.S. Cl.
CPC ... *G06Q 10/063112* (2013.01); *G06F 40/295* (2020.01); *G06Q 10/06311* (2013.01); *G06Q 10/101* (2013.01); *G06Q 50/01* (2013.01)

(58) Field of Classification Search
None
See application file for complete search history.

(56) References Cited

U.S. PATENT DOCUMENTS 7,730,030 B1   6/2010 Xu
8,522,152 B2 *  8/2013 Baldwin ............... G06Q 10/10
                                                          715/751
(Continued)

FOREIGN PATENT DOCUMENTS

EP        2916273 A1 *  9/2015  ............. G06N 7/005
WO    WQ-2011088053 A2 *  7/2011  ............. G06N 5/022
(Continued)

OTHER PUBLICATIONS

Tu, Kewei, et al. "Joint video and text parsing for understanding events and answering queries." IEEE MultiMedia 21.2 (2014): 42-70. (Year: 2014).*

(Continued)

*Primary Examiner* — Matthew S Gart
*Assistant Examiner* — Derick J Holzmacher
(74) *Attorney, Agent, or Firm* — Newport IP, LLC; Jacob P. Rohwer

(57) ABSTRACT

The techniques describe a tool that finds people to help answer a question that arises while a user is consuming content of a file. As the user consumes the content, the techniques identify a signal that indicates an issue (e.g., a question). The signal can be added or somehow inserted into the underlying content of the file based on user input. The techniques determine a portion of the content associated with the signal. The portion of the content, along with any other information provided via the user input, is analyzed to determine a context of the issue. For example, natural language processing techniques can parse text or speech to understand the subject matter. The techniques then access a resolution resource (e.g., a professional network) to identify people that are likely capable of providing assistance, and the people are suggested to the user.

20 Claims, 8 Drawing Sheets

(51) Int. Cl.
*G06Q 10/10* (2012.01)
*G06F 40/295* (2020.01)

(56) References Cited

U.S. PATENT DOCUMENTS

| | | | | |
|---|---|---|---|---|
| 8,751,521 | B2* | 6/2014 | Lee | H04L 67/306 707/767 |
| 9,654,640 | B1* | 5/2017 | Brydon | H04M 3/5166 |
| 2006/0085750 | A1* | 4/2006 | Easton, Jr. | G06F 9/453 715/708 |
| 2013/0158984 | A1* | 6/2013 | Myslinski | G06F 16/951 704/9 |
| 2014/0040385 | A1* | 2/2014 | Hofman | G06Q 10/10 709/206 |
| 2014/0119531 | A1* | 5/2014 | Tuchman | H04M 3/5166 379/265.09 |
| 2015/0154721 | A1* | 6/2015 | Thompson | G16H 50/30 705/2 |
| 2015/0178373 | A1* | 6/2015 | Smith | H04L 65/1069 707/722 |
| 2015/0254785 | A1* | 9/2015 | Yang | G06Q 30/0613 705/26.41 |
| 2015/0339616 | A1 | 11/2015 | Pursche et al. | |
| 2015/0346937 | A1* | 12/2015 | Mahmoudian-Bidgoly | G06F 3/04812 715/753 |
| 2016/0098752 | A1* | 4/2016 | Rubinstein | G06Q 30/0256 705/14.54 |
| 2016/0219078 | A1* | 7/2016 | Porras | H04L 41/12 |
| 2016/0292570 | A1* | 10/2016 | Kozloski | G06F 40/289 |
| 2017/0353423 | A1* | 12/2017 | Morrison | G06F 16/951 |

FOREIGN PATENT DOCUMENTS

| | | | | |
|---|---|---|---|---|
| WO | WO-2013173788 | A1* | 11/2013 | G06Q 50/30 |
| WO | WO-2015013436 | A2* | 1/2015 | G06Q 50/01 |

OTHER PUBLICATIONS

Al Qady, Mohammed, and Amr Kandil. "Concept relation extraction from construction documents using natural language processing." Journal of construction engineering and management 136.3 (2010): 294-302. (Year: 2010).*

Duarte, Natasha, Emma Llanso, and Anna C. Loup. "Mixed Messages? The Limits of Automated Social Media Content Analysis." FAT. 2018. (Year: 2018).*

"International Search Report and Written Opinion Issued in PCT Application No. PCT/US19/016207", dated May 10, 2019, 10 Pages.

Chuan, et al., "Link prediction in co-authorship networks based on hybrid content similarity metric." Appl Intell 48, 2470-2486 [abstract] (2018). https://doi.org/10.1007/s10489-017-1086.

Chen, et al., "CollabSeer: A Search Engine for Collaboration Discovery," JCSL, Jun. 13-17, 2011, 10 pages.

Lee, et al., "Recommending Future Collaborators using Social Features and MeSH terms," Proceedings of the American Society for Information Science and Technology, 48(1), Oct. 2011, 9 pages.

Yu, et al., "Predicting Co-Author Relationship in Medical Co-Authorship Networks," PLoS One, 2014; 9(7): Jul. 3, 2014, 7 pages.

Das, "Beginners Guide to learn about Content Based Recommender Engines," Analytic Vidhya, reference downloaded Jun. 18, 2020, https://www.analyticsvidhya.com/blog/2015/08/beginners-guide-learn-content-based-recommender-systems/, 12 pages.

* cited by examiner

SUGGESTING PEOPLE QUALIFIED TO PROVIDE ASSISTANCE WITH REGARD TO AN ISSUE IDENTIFIED IN A FILE

BACKGROUND

When a user is consuming (e.g., viewing, listening to, reviewing, editing, etc.) content of a file, the user may often have a question with regard to a portion of the underlying content. When a question arises in the user's mind, the user often does not know who to contact to have the question answered. In some situations, if the question is important or urgent, the user may likely have to stop what he or she is doing (e.g., interrupt the consumption of the content) and reach out to one or more people the user knows with the hope that one of the people can answer the question or point the user in the right direction. Ultimately, a considerable amount of time may be spent searching for someone until a person that can help answer the question is found. This can cause user frustration related to a content consumption experience.

SUMMARY

The techniques disclosed herein describe a tool that helps find and suggest people that are qualified to answer a question that arises while a user is consuming content of a file (e.g., viewing or reading the content, listening to the content, reviewing the content, editing the content, etc.). The tool is configured to seamlessly provide assistance while the user is still consuming the content of the file. Stated another way, the user does not have to exit or interrupt the content consumption experience to search for someone to answer a question.

As described herein, the question can comprise an issue. Other types of issues that can arise or be noticed by a user as the user is consuming the content of the file can include a potential mistake or a confusing presentation of information. For instance, the file may contain incorrect or confusing text, incorrect or confusing information such as a potentially wrong name or a misplaced data chart, an incorrect or confusing graphical element (e.g., a feature edited into a video clip, etc.). A file can include a document (e.g., a text processing document), a spreadsheet, a presentation or slide deck, a web page, an image or a photo, audio-visual media (e.g., a video clip, a video conference session, etc.), a communication (e.g., an email, a text message, a chat message, etc.), or any other type of file or object that can be visually and/or audibly consumed by a user.

The content of a file is output by a device so a user can consume the content. For example, the content of the file can include visual content to be displayed on a display screen so a user can view the visual content of the file (e.g., text, data, graphics, video, etc.). In another example, the content of the file can include audible content (e.g., sound) that is output by a speaker of the device so a user can hear the audible content of the file. As the user consumes the content being output by the device, the techniques described herein identify a signal that indicates an issue (e.g., a question). In some implementations, the signal can be added or somehow inserted into the underlying content of the file based on input provided by the user. For example, the user may employ a commenting or editing feature to add a comment to a file. In another example, the user may employ a tagging feature to place a marker at a particular location in a file (e.g., on a graphic in a slide, on a video frame or a video segment, etc.). In yet another example, the user may employ a formatting feature to provide input that alters a format of a portion of content in the file (e.g., highlight text, bold text, underline text, italicize text, etc.). In alternative implementations, the signal can comprise speech and/or sounds spoken by the user.

An example signal that can be monitored for and identified (e.g., detected) includes a keyword or a key phrase a user employs to indicate an issue (e.g., "to do", "question", "revisit", "confusing", "come back", etc.). The keyword or key phrase can be a general keyword or key phrase commonly used by a population of users to indicate an issue, or the keyword or key phrase can be specifically defined as a signal for a particular user. Another example signal that can be monitored for and identified includes a specific ASCII character (e.g., "Q", "q", "?", etc.), or some sort of symbol or icon (e.g., a confused emoji or some other type of emoji). Again, the specific character, symbol, or icon can be generally known to be used by a population of users to indicate an issue, or can be specifically defined as a signal for a particular user. In yet another example, a signal can include an alteration to a format of a portion of content in the file, as described above. In even a further example, a signal can include a marker associated with a portion of the content, as described above. Consequently, the user input provided while a user is consuming the content of a file can include the signal along with other text (e.g., a "Q:" followed by text of a question, text of a question followed by a "?", etc.) and/or the user input can comprise the signal (e.g., a comment associated with a sentence in a document that only includes a "Q" or a "To do"). In some implementations, signals being monitored for can be associated with a particular type of the file. That is, the signals being monitored for while a user is consuming a text processing document (e.g., comments with a specific character, highlighting, etc.) may be different than the signals being monitored for while a user is consuming slides of a presentation (e.g., a marker placed at a particular location on a slide).

Upon identifying the signal, the techniques are configured to determine a portion of the content associated with the signal. For example, a marker may be placed in the content of a file right on top of underlying text or an underlying graphic. In another example, a comment may be connected to a portion of text (e.g., a page, a paragraph, a sentence, a phrase, a word), a slide in a presentation, or a video frame or a video segment. The portion of the content, along with any other information provided via the user input (e.g., a specific question), is then analyzed to determine a context of the issue. For example, natural language processing techniques can parse text or speech to understand, or better understand, the subject matter related to an issue (e.g., a topic, a technical field or technical area, a news category, a type of data, a medical field, etc.). Image or video processing techniques may be implemented to analyze a graphic (e.g., a data chart, a photo, etc.) to understand, or better understand, the subject matter related to an issue. The context can then be used to identify people that are likely capable of providing assistance with regard to resolving the issue.

In various examples, the techniques are configured to output a query configured to determine whether the user desires assistance with regard to resolving the issue. For instance, a device can display a prompt or other type of user interface element that asks the user to confirm that the user wants to be connected with people that can likely help resolve the issue. Alternatively, a device can audibly ask the user to confirm that the user wants to be connected with other people that can likely help resolve the issue. Accordingly, the query can be used as a mechanism to confirm, with the user, that there is in fact an issue that the user cannot resolve on his or her own. In some situations, the query can also request confirmation that the context of the issue is correct. This provides the user with an opportunity to focus the context of the issue (e.g., refine a question) before the system searches for and finds people that can likely help resolve the issue.

To identify people that are likely capable of providing assistance, the techniques are configured to access one or multiple designated resolution resources to match information about people with the subject matter of the issue. A resolution resource can include personal information that describes or represents qualifications for individual persons (e.g., work experience, credentials, certifications, awards, published articles, employment positions, performance metrics, peer reviews, etc.). In some examples, an evaluation of the available personal information can be implemented to determine if a person has extensive knowledge in the subject matter (e.g., technical field) and/or to qualify a person as an expert with respect to the subject matter. Accordingly, a resolution resource can include professional profiles that are part of a professional network, social profiles that are part of a social network, employee profiles that are part of an enterprise network, communications previously sent or received by the user along with contents of the communications (e.g., emails, text messages, group chat messages, etc.), work products previously generated by the user or by a team of which the user is a part, and so forth. A resolution resource can also information that represents relationships between the user and a person (e.g., a professional network relationship, a social network relationship, previous work relationships, previous communications, etc.). In some implementations, a resolution resource can include metadata associated with the file. For instance, a person that created the content that is causing the issue may be a person that is likely capable of resolving the issue or answering a question about the content.

The people that are likely capable of providing assistance with regard to resolving the issue can then be suggested to the user. The signal can be detected in real-time and the suggestions can be made while the user is still consuming the content of the file. Consequently, the user can potentially have the issue resolved immediately if he or she wants to seamlessly reach out to one of the suggested people. In one example, the techniques are configured to prioritize the people suggested based on a strength of a network relationship between the user and an individual person. In this example, the strength of the network relationship can be established based on number of levels of separation between the user and the individual person in a professional network or a social network. For instance, a first person that is a first level (e.g., direct) contact or friend of the user in a network may be prioritized over a second person that is a second level (e.g., indirect) contact or friend (e.g., a contact of a contact, a friend of a friend, etc.) because the user likely knows the first person and the user may not know the second person. In another example, the techniques are configured to prioritize the people suggested based on a strength of a working relationship between the user and an individual person. In this example, the strength of the working relationship can be established based on a number of times the user and the individual person have communicated with one another or a number of times the user and the individual person have worked (e.g., collaborated) on a project together. The working relationship can be determined by scanning work records and/or work communications associated with a user device and/or user accounts. The more a user has worked or interacted with someone likely correlates to a level of comfort related to reaching out to ask a question or have an issue resolved. In yet another example, the techniques are configured to prioritize the people suggested based on the physical proximity of a location of an individual person to a location of the user. For example, if a first subject matter expert works in the same building as the user, and a second subject matter expert works in a different state or maybe even a different country, then the first subject matter expert would be prioritized over the second subject matter expert.

The information that is output by the device to suggest the people likely capable of providing assistance with regard to resolving the issue can include names of the people and/or contact information (e.g., a phone number, an email, an office location, etc.). Moreover, elements of the information may be selectable such that the user can directly contact a person (e.g., click on the phone number to implement a phone call, click on an alias to implement a video conference or to generate/send an email), and the elements may indicate a person's availability (e.g., online, away from desk, offline, etc.). Further, elements of the information may be selectable to navigate the user to a resource where more information about the person can be provided so the user can further evaluate the qualifications of a person before reaching out to ask a question. For instance, a link to an intranet page with an employee profile, a link to a web page with a publicly available professional profile, etc. can be provided along with a suggestion of a name. In some implementations, the information that is output by the device can include a snapshot of the considerations used to qualify a person and/or prioritize the person. For instance, credentials and work experience can be listed under a person's name (e.g., John has been identified because he has a master's degree in computer science and has written over five hundred programs in JAVA, etc.) Moreover, information that identifies a previous or an established relationship can be listed (e.g., John is a LINKEDIN contact in your personal LINKEDIN network, John worked with you and your team on the XYZ project, an analysis of your communication history indicates that you and John communicated with each other frequently in association with the XYZ project, etc.).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques disclosed herein describe a tool that helps find and suggest people that are qualified to answer a question that arises while a user is consuming content of a file (e.g., viewing or reading the content, listening to the content, reviewing the content, editing the content, etc.). As the user consumes the content, the techniques identify a signal that indicates an issue (e.g., a question). The signal can be added or somehow inserted into the underlying content of the file based on input provided by the user. The techniques are configured to determine a portion of the content associated with the signal. For example, a marker may be placed in the file right on top of underlying text or an underlying graphic. In another example, a comment may be connected to a portion of text (e.g., a page, a paragraph, a sentence, a phrase, a word), a slide in a presentation, or a video frame or a video segment. The portion of the content, along with any other information provided via the user input, is analyzed to determine a context of the issue. For example, natural language processing techniques can parse text or speech to understand, or better understand, the subject matter related to an issue. The techniques are configured to access one or more designated resolution resources to identify people that are likely capable of providing assistance, and the people can be suggested to the user. Consequently, the assistance can be provided seamlessly while the user is still consuming the content of the file. Stated another way, the user does not have to exit or interrupt the content consumption experience to search for someone to answer a question.

It should be appreciated that the subject matter described herein may be implemented as a computer-controlled apparatus, a computer process, a computing system, or as an article of manufacture such as a computer-readable storage medium. Among many other benefits, the techniques described herein improve efficiencies with respect to a wide range of computing resources. For instance, human interactions with a device may be improved as the techniques disclosed herein are configured to enable a user to efficiently and effectively identify someone who can provide assistance (e.g., answer a question, resolve an issue, etc.). Other technical effects other than those mentioned herein can also be realized from implementations of the technologies disclosed herein.

Figure 1:
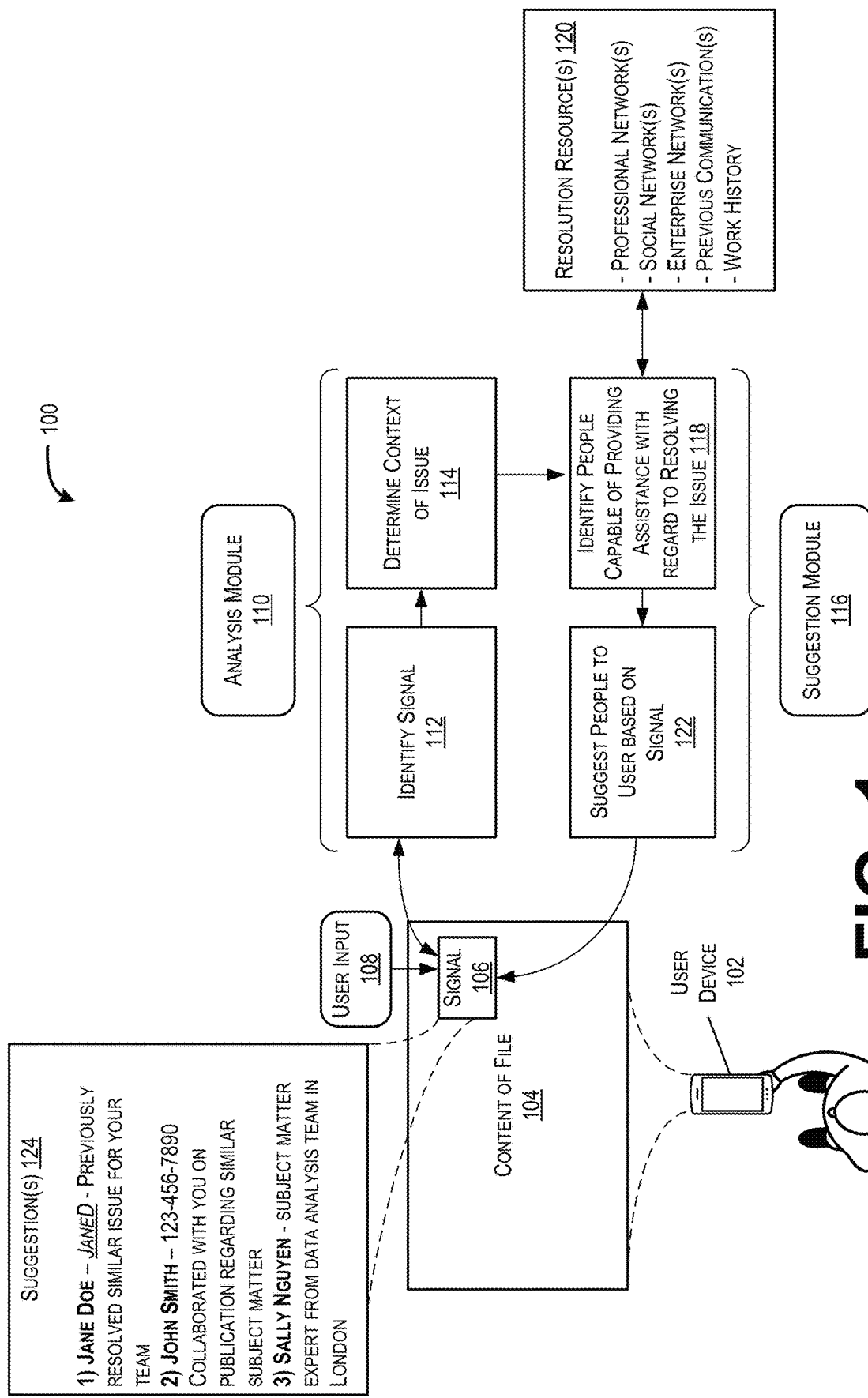
FIG. 1 illustrates a diagram of an example environment in which a system can identify a signal that indicates an issue (e.g., a question), can identify people that are likely capable of resolving the issue, and can suggest the people to a user.

FIG. 1 includes a diagram 100 that illustrates an example environment in which a system can identify a signal that indicates an issue (e.g., a question), can identify people that are likely capable of resolving the issue, and can suggest the people to a user. The techniques described herein can be implemented by various systems and/or computing devices, over various networks, as further described herein with respect to FIGS. 5-8. In FIG. 1, a user employs a user device 102 to output content of a file 104. For example, the user device 102 can display the content via a display screen and/or the user device 102 can audibly output the content (e.g., speech, sound, etc.) of the file via a speaker. To this end, the file can include a document (e.g., a text processing document), a spreadsheet, a presentation or slide deck, a web page, an image or a photo, audio-visual media (e.g., a video clip, a video conference session, etc.), a communication (e.g., an email, a text message, a chat message, etc.), or any other type of file or object that can be visually and/or audibly consumed by a user.

FIG. 1 further illustrates a signal 106 that is added or somehow inserted into the underlying content of the file 104 based on input 108 provided by the user. For example, the user may employ a commenting or editing feature to add a comment to a file. In another example, the user may employ a tagging feature to place a marker at a particular location in a file (e.g., on a graphic in a slide, on a video frame or a video segment, etc.). In yet another example, the user may employ a formatting feature to provide input that alters the original format of a portion of content in the file (e.g., highlight text, bold text, underline text, italicize text, etc.). As the user consumes the content of the file 104 being output by the user device 102, an analysis module 110 is configured to identify 112 (e.g., detect) the signal 106. In alternative implementations, the signal 106 can comprise spoken language or sounds produced by the user (e.g., a user audibly asks a question that is captured by a microphone of the user device 102 while the user is consuming the content of the file 104).

As described above, the signal 106 is indicative of an issue (e.g., a question), and thus, the analysis module 110 is configured to monitor for particular signals that indicate an issue. Example signals 106 are described herein with respect to FIG. 2. An issue can comprise a user question that arises while the user is consuming the content of the file 104. Other types of issues that can arise or be spotted as a user is consuming the content of the file 104 can include a potential mistake or a confusing presentation of information. For instance, the file may contain incorrect or confusing text, incorrect or confusing information such as a wrong name or a misplaced data chart, an incorrect or confusing graphic (e.g., a feature edited into a video clip, etc.).

Upon identifying 112 the signal 106, the analysis module 110 is configured to determine a portion of the content associated with the signal 106. For example, a marker may be placed directly on top of underlying text or an underlying graphic. In another example, a comment may be connected or mapped to a portion of text (e.g., a page, a paragraph, a sentence, a phrase, a word), a slide in a presentation, or a video frame or a video segment. In yet another example, an audible question of the user can be mapped to the content currently displayed on the display screen. The portion of the content, along with any other information provided via the user input 108 (e.g., a specific question typed in a comment), is analyzed to determine 114 a context of the issue. For example, the analysis module 110 can use natural language processing techniques to parse text or speech to understand, or better understand, the subject matter related to an issue. Other techniques such as image or video processing techniques may be implemented to analyze visual data (e.g., a data chart, a photo, a video clip, a video frame, etc.) to understand, or better understand, the subject matter related to an issue. In some cases, the analysis can look beyond the portion of content that may be specifically associated with a signal to determine the context of the issue (e.g., text written before and/or after a sentence that is highlighted or that is called out using a commenting feature, a slide that is before and/or after a slide on which a marker is placed, etc.).

The context of the issue is then passed to a suggestion module 116. The suggestion module 116 uses the context of the issue to identify 118 people that are likely capable of providing assistance with regard to resolving the issue. For example, the suggestion module 116 can access information stored and maintained in association with various resolution resource(s) 120 to qualify someone as a candidate that is capable of providing assistance with regard to resolving the issue. A resolution resource can include personal information that describes or represents qualifications for individual persons (e.g., work experience, credentials, certifications, awards, published articles, employment positions, performance metrics, peer reviews, etc.). In some examples, an evaluation of the available personal information can be implemented to determine if a person has extensive knowledge in a particular area (e.g., a topic, a technical field, a news category, a type of data, a medical field, etc.) and/or to qualify a person as an expert with respect to the subject matter. Accordingly, a resolution resource 120 can include professional profiles that are part of a professional network, social profiles that are part of a social network, employee profiles that are part of an enterprise network, communications previously sent or received by the user along with contents of the communications (e.g., emails, text messages, group chat messages, etc.), a work history (e.g., records of work products and work projects) for the user or a team of which the user is a part, and so forth. In some implementations, a resolution resource can include metadata associated with the file. For instance, a person that created the content that is causing the issue may be a person that is likely capable of resolving the issue or answering a question about the content. Consequently, based on personal information accessed and evaluated, the suggestion module 116 can match one or more people with the context of the issue (e.g., the underlying subject matter, topic, technical field, etc.).

The suggestion module 116 is then configured to suggest 122 people that are likely capable of providing, or qualified to provide, assistance with regard to resolving the issue. For example, a graphical user interface element that contains the suggestions 124 can be displayed in association with the signal 106. As shown, the suggestions 124 list "Jane Doe", "John Smith", and "Sally Nguyen" as people likely capable of providing assistance to the user with regard to resolving the issue (e.g., answering a question, correcting a possible mistake, clarifying a confusing statement, etc.). In various examples, the suggestion module 116 considers privacy and/or security of the content of the file 104 when making the suggestions 124. For instance, the file may include permissions that must be followed when accessing the file (e.g., based on user identification, user status, user employment level, user security clearance, etc.). Accordingly, the suggestion module 116 may only suggest people that have the appropriate permission to access the file. In another example, the suggestions 124 can be audibly output by the user device 102.

Since the signal 106 can be detected in real-time as user input 108 is provided, the suggestions 124 can be provided to the user while the user is still consuming the content of the file 104. Consequently, the user can potentially have the issue resolved immediately if he or she wants to seamlessly reach out to one of the suggested people. Stated another way, the user does not have to exit or interrupt the content consumption experience to search for someone to answer a question.

Figure 2:
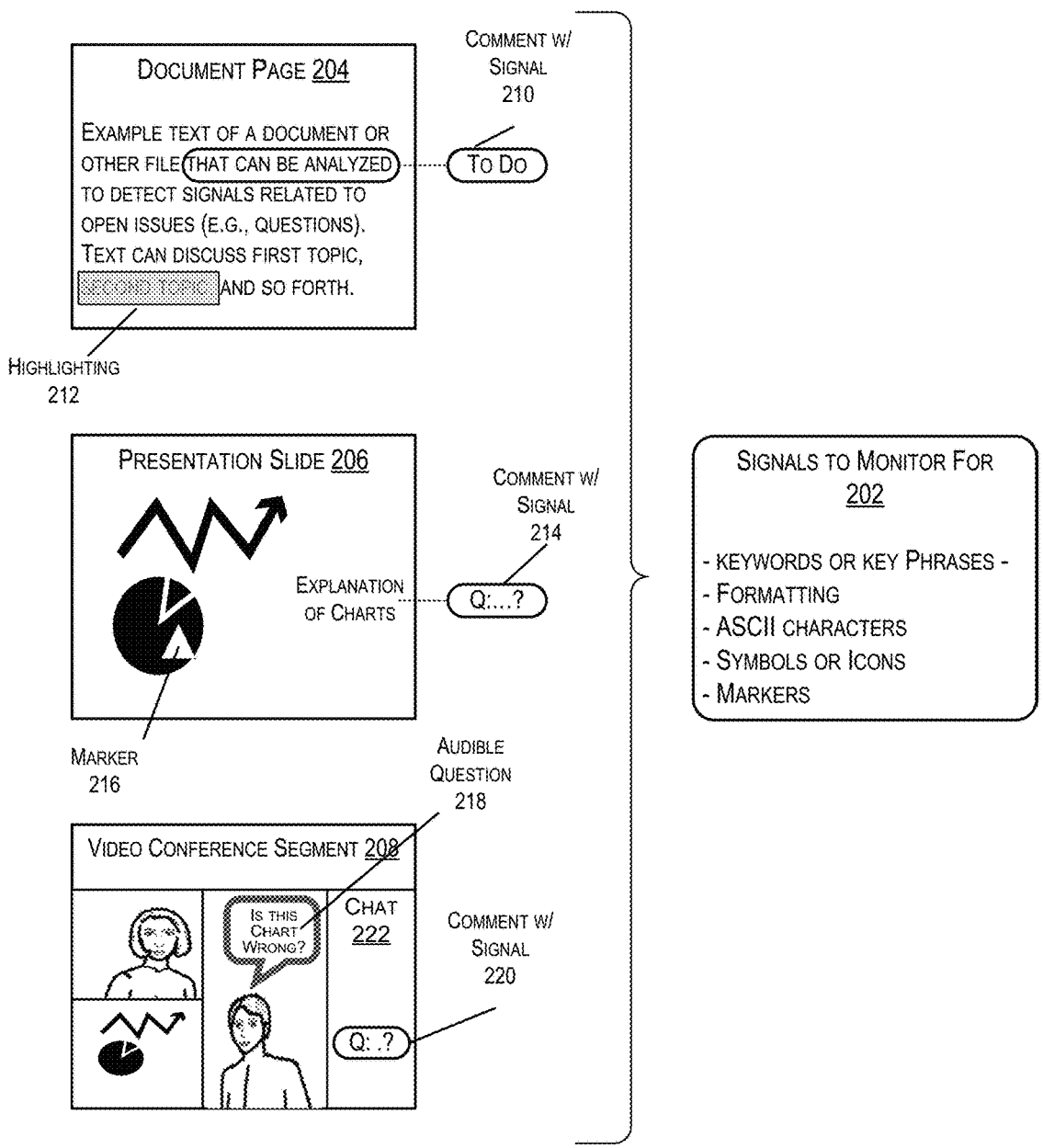
FIG. 2 illustrates a diagram that captures example signals that are being monitored for and that can be detected.

FIG. 2 illustrates a diagram 200 that captures example signals that are being monitored for 202 by the analysis module 110 and that can be detected by the analysis module 110. As described above, the techniques described herein can be implemented in association with different types of files. For ease of discussion, FIG. 2 illustrates a page 204 of document, a slide 206 of a presentation, and a video segment 206 of a video conference.

A first example signal comprises a keyword or a key phrase a user employs to indicate an issue (e.g., "to do", "question", "revisit", "confusing", "come back", etc.). The keyword or key phrase can be a general keyword or key phrase commonly used by a population of users to indicate an issue, or the keyword or key phrase can be specifically defined as a signal for a particular user. As shown with respect to the document page 204, user input can add a comment 210 that includes the key phrase "To Do". When this comment 210 is added to the document page 204, and associated with a portion of the content (e.g., the text that states "that can be analyzed"), the signal can immediately be detected by the analysis module 110.

A second example signal comprises an alteration to an original format of a portion of content in the file. As shown with respect to the document page 204, user input can highlight 212 a portion of the text (e.g., the text that states the "second topic"), and when this highlight 212 alters that format of the content, the signal can immediately be detected by the analysis module 110.

A third example signal comprises a specific ASCII character (e.g., "Q", "q", "?", etc.), or some sort of symbol or icon (e.g., a confused emoji or some other type of emoji). Again, the specific character, symbol, or icon can be generally known to be used by a population of users to indicate an issue, or can be specifically defined as a signal for a particular user. As shown with respect to the slide 206, user input can add a comment 214 that includes the character "Q" and/or the punctuation "?" (e.g., the comment 214 may also include text that composes a question or explains the issue). When this comment 214 is added to the slide 206 and/or associated with a portion of the content (e.g., the text stating "explanation of the charts"), the signal can immediately be detected by the analysis module 110.

A fourth example signal comprises a marker. The marker can be placed at a particular location on top of the underlying content. Moreover, to be recognized as a signal, the marker may have a predefined shape. As shown with respect to the slide 206, user input can add a marker 216 (e.g., a triangle shape) on top of a pie chart or a portion of a pie chart that may include incorrect or confusing data. When the marker 216 is added to the slide 206, the signal can immediately be detected by the analysis module 110 to determine that there is an issue related to the pie chart.

As further illustrated in FIG. 2 with respect to the video conference segment 208, a signal can also include an audible question 218 asked by a user (e.g., "Is this chart wrong?") that is part of the content being consumed. Additionally or alternatively, a user consuming the content can also ask an audible question that includes a signal that can be detected. Moreover, a signal can be included in a comment 220 that is submitted to a chat conversation 222 and that is associated with a particular frame or segment of the video conference, based on a time when the comment 220 is submitted.

Suggestions of people that are likely capable of providing assistance with regard to resolving an issue can be made based on detection of any of these signals. In some implementations, specific signals being monitored for can be associated with a particular type of the file. That is, the signals being monitored for while a user is consuming a document (e.g., comments with a specific character, highlighting, etc.) may be different than the signals being monitored for while a user is consuming slides of a presentation (e.g., a marker placed at a particular location on a slide).

Figure 3:
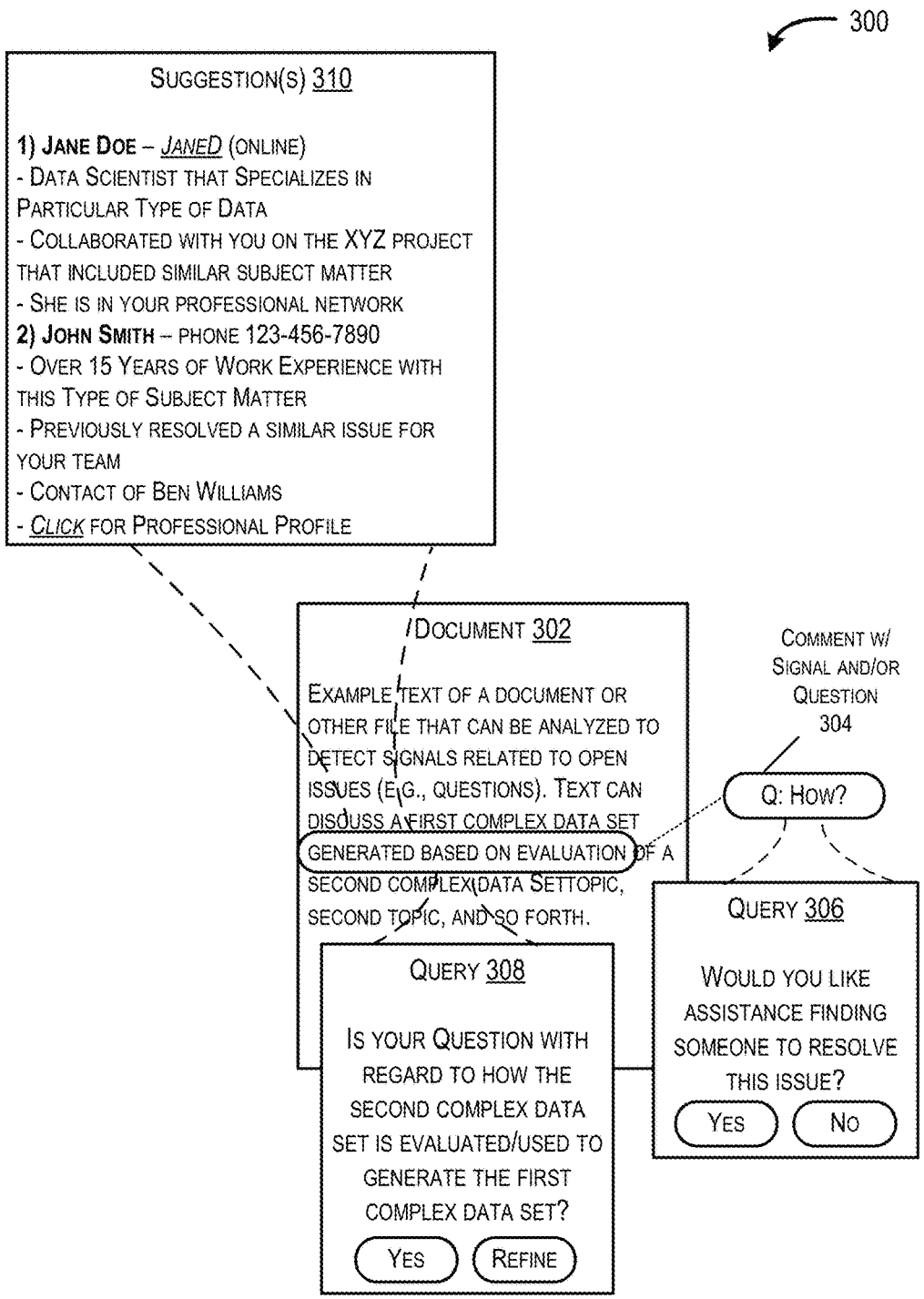
FIG. 3 illustrates a diagram that captures graphical user interface elements a system can provide to a user to confirm that assistance is desired by the user and/or to suggest people that can likely provide assistance with regard to resolving an issue.

FIG. 3 illustrates a diagram 300 that captures graphical user interface elements a system can provide to a user to confirm that assistance is desired by the user and/or to suggest people that can likely provide assistance with regard to resolving an issue. FIG. 3 illustrates a portion (e.g., a page) of a document 302 that is being consumed by a user via a display screen. While consuming the text of the document 302, the user employs a commenting feature to add a comment 304 with a signal (e.g., "Q", "?"). In some instances, the user input can provide specific information that reflects the context of the issue (e.g., a specific or pointed question that is clear and direct). However, in other cases, such as the one shown in FIG. 3, the user input may be limited. That is, the user types "How" between the signals "Q" and "?" and the user associates the comment 304 with a portion of the text—"generated based on evaluation". In these types of situation, the analysis module 110 likely has to analyze the portion of the text associated with the comment 304, and/or text that surrounds the portion of the text associated with the comment to attempt to determine the context of the issue (e.g., what the user means by asking "How?").

In various examples, the analysis module 110 is configured to output a query 306 configured to determine whether the user desires assistance with regard to resolving the issue. In the example of FIG. 3, the query 306 is provided via a user interface element associated with the comment 304, and the query 306 asks "Would you like assistance finding someone to resolve this issue?". The query 306 provides the user with options to confirm that assistance is desired (e.g., "Yes" option), or to deny or reject the assistance (e.g., the "No" option). Alternatively, the analysis module 110 is configured to audibly ask the user to confirm that the user desires to be connected with other people that can likely help resolve the issue.

In various examples, the analysis module 110 is configured to output a query 308 configured to request confirmation that the context of the issue, as determined by the analysis module 110, is correct. In the example of FIG. 3, the query 308 is provided via a user interface element associated with the portion of content associated with the comment 304, and the query 308 asks "Is your question with regard to how the second complex data set is evaluated/used to generate the first complex data set?". The query 308 provides the user with options to confirm the context of the issue (e.g., "Yes" option), or to refine or focus the context of the issue (e.g., the "Refine" option) by editing the question to better capture the context of the issue. Alternatively, the analysis module 110 is configured to audibly ask the user to confirm that the context of the issue is correct. The analysis module 110 can produce a confidence score associated with a determined context and can be configured to output the query 308 if the confidence score is less than a threshold. The confidence score can be produced based on the effectiveness of the natural language processing techniques in parsing the content and/or the user input. In some implementations, query 306 and query 308 can be provided in the same graphical user interface element.

Moving on, FIG. 3 illustrates suggestions 310 of people that are likely capable of providing assistance with regard to resolving the issue. The suggestions 310 can be graphically associated with the portion of content that caused the issue and/or the comment 304. The information can include names of the people and/or contact information. For example, Jane Doe is associated with an alias or other user identifier and a status (e.g., "JaneD" is currently "online" and available). The alias may be configured as a selectable element so that the user can directly contact a person (e.g., click on an alias to implement a video conference or to generate/send an email). In some implementations, upon selection or activation of an element, a communication (e.g., an email, a video conference session, etc.) can include auto-generated or auto-populated content that captures a background context of the issue for an intended recipient (e.g., file name, file type, identification of the user that has the issue, context of the issue, etc.). In this way, the recipient of the communication can be quickly brought up to speed when preparing to answer a question. In another example, John Smith is associated with a phone number, and a link to John Smith's professional profile can be provided so the user can further evaluate his qualifications (e.g., "Click for Professional Profile").

The information can also include a snapshot of the considerations used to qualify a person, so that the user can quickly gain an understanding of why a person is being recommended without having to look outside the consumption experience. For instance, credentials and work experience can be listed under a person's name (e.g., Jane Doe is a "data scientist" that specializes in a particular type of data, John Smith has "Over 15 years of work experience with this type of subject matter", etc.). Moreover, information that identifies a previous working relationship can be listed (e.g., Jane Doe "collaborated with you on the XYZ project which included similar subject matter", John Smith "previously resolved a similar issue for your team", etc.). Even further, information that identifies a current network relationship or how people are connected can be listed (e.g., Jane Doe is "in your professional network", John Smith is not in your professional network but is a "contact of Ben Williams", etc.).

In one example, the suggestion module 116 is configured to prioritize the people suggested based on a strength of a network relationship between the user and an individual person. In this example, the strength of the network relationship can be established based on number of levels of separation between the user and the individual person in a professional network or a social network. For instance, Jane Doe may be prioritized over John Smith and others because Jane Doe is in the user's own personal professional network (e.g., a direct or first level contact), while John Smith is a second level contact (e.g., a contact of Ben Williams, who the user likely knows). In another example, the suggestion module 116 is configured to prioritize the people suggested based on a strength of a working relationship between the user and an individual person. In this example, the strength of the working relationship can be established based on a number of times the user and the individual person have communicated with one another or a number of times the user and the individual person have worked (e.g., collaborated) on a project together. The working relationship can be determined by scanning work records and/or work communications associated with a user device and/or user accounts. In yet another example, the suggestion module 116 is configured to prioritize the people suggested based on the physical proximity of a location of an individual person to a location of the user.

In some examples, the suggestion module 116 can provide separate lists of people based on working and/or network relationships. For instance, a first list includes people the user knows or likely knows (e.g., qualified people that are within a user's own personal network or that the user has previously worked directly with before). A second list can include people the user likely does not know, but to which the user has some sort of pre-established connection (e.g., a qualified person who is a contact of a colleague, a qualified person who has worked with the user's team previously, a qualified person who works for the same company or in the same department or office building, etc.). A third list can include people identified via a universal search which includes no boundaries (e.g., qualified people identified in a professional network that work for different companies).

Figure 4:
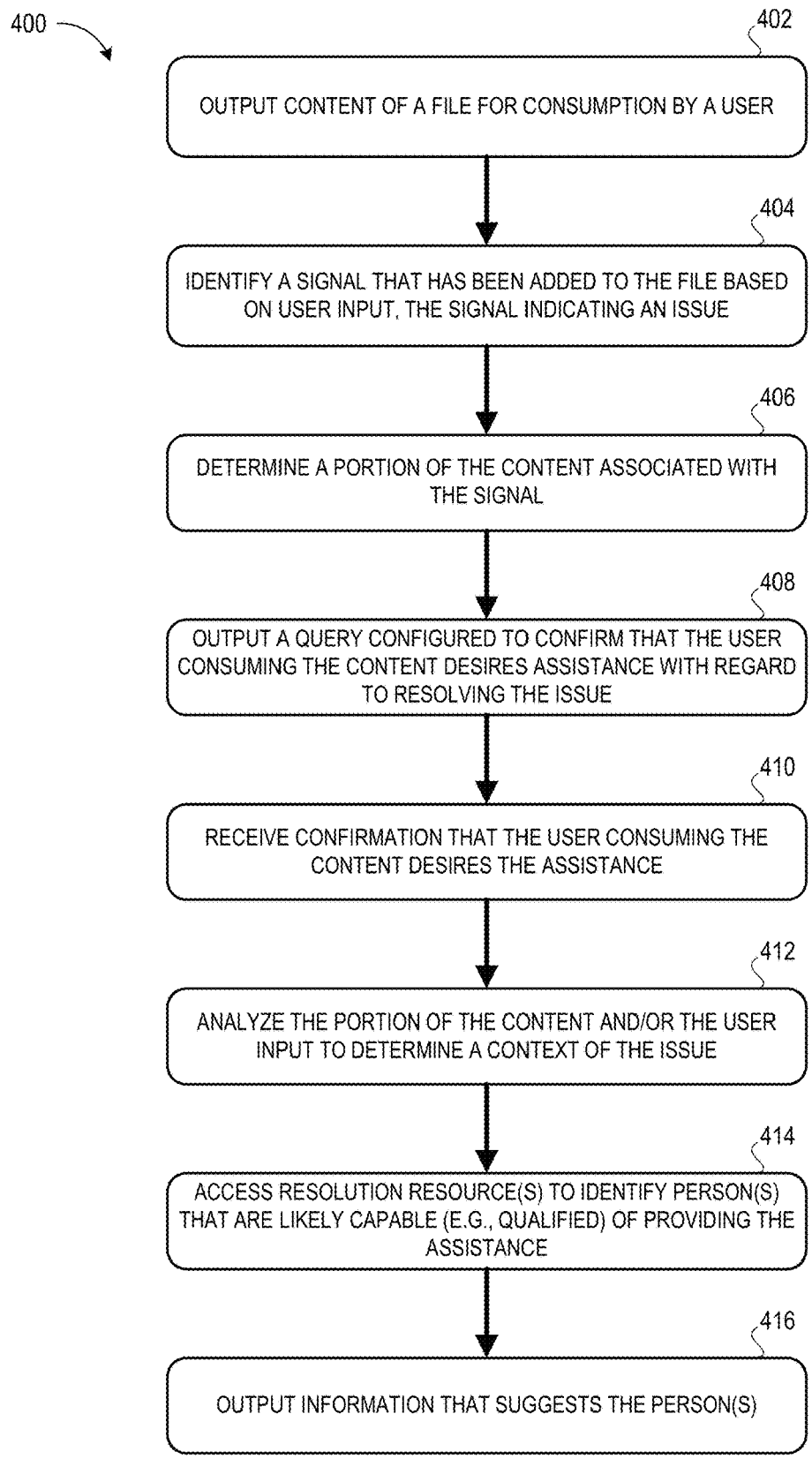
FIG. 4 illustrates a diagram of an example flowchart that illustrates operations directed to identifying a signal that indicates an issue (e.g., a question), identifying people that are likely capable of resolving the issue, and suggesting the people to a user.

FIG. 4 contains a flowchart of a method. It should be understood that the operations of the method disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., the user device 102 and/or devices of a service provider as further described herein).

FIG. 4 is a diagram of an example flowchart 400 that illustrates operations directed to identifying a signal that indicates an issue (e.g., a question), identifying people that are likely capable of resolving the issue, and suggesting the people to a user.

At operation 402, content of a file is output (e.g., displayed) so that it can be consumed by a user.

At operation 404, a signal that has been added to the file based on user input is identified (e.g., detected). As described above, the signal is indicative of an issue related to the content.

At operation 406, a portion of the content associated with the signal is determined.

At operation 408, a query configured to confirm that the user consuming the content desires assistance with regard to resolving the issue is output.

At operation 410, confirmation that the user consuming the content desires the assistance is received.

At operation 412, the portion of the content and/or the user input is analyzed to determine a context of the issue.

At operation 414, resolution resources are accessed to identify persons that are likely capable of providing the assistance.

At operation 416, information that suggests the identified persons is output.

Figure 5:
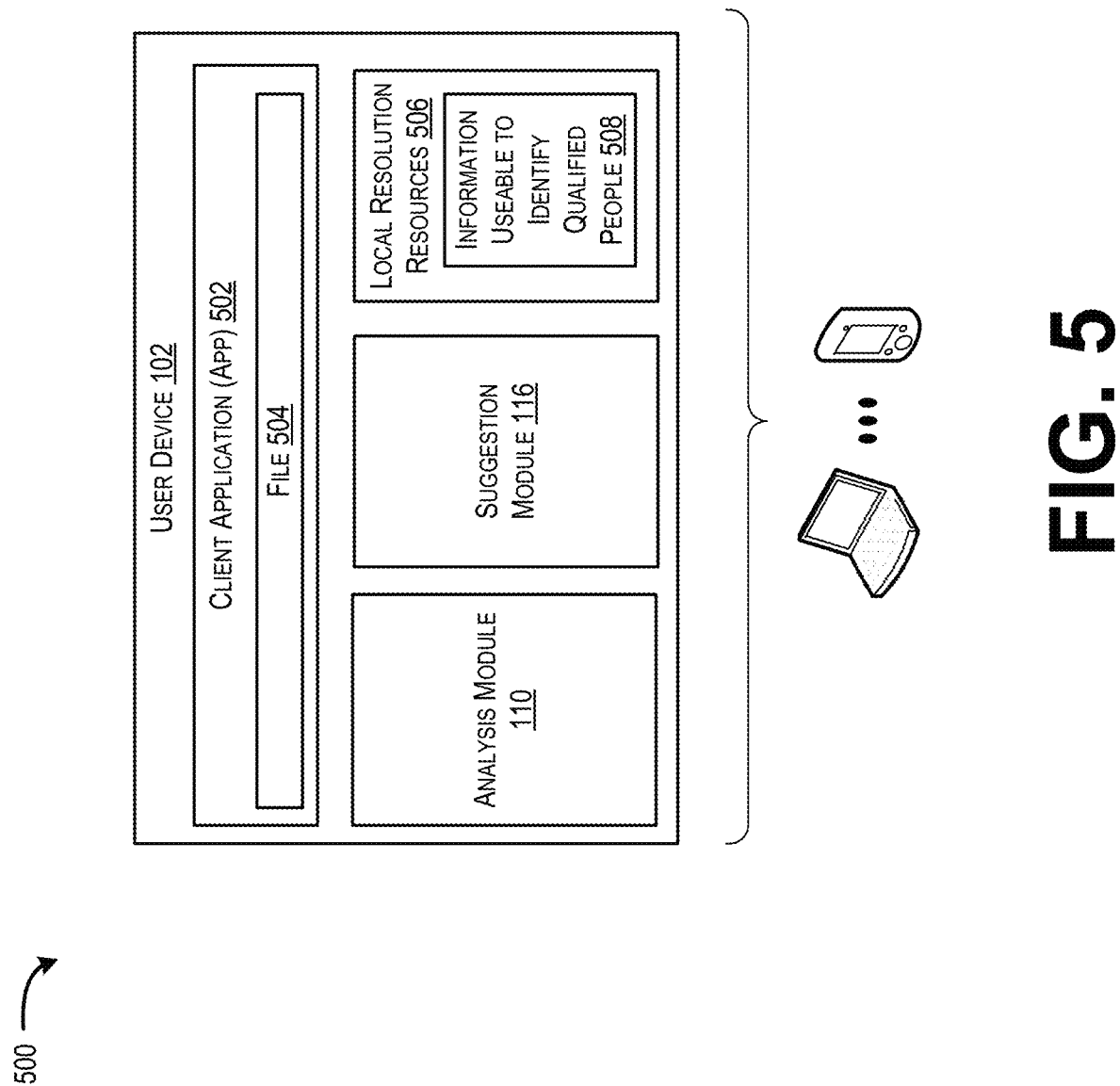
FIG. 5 illustrates a diagram of an example user device capable of implementing aspects of the techniques and technologies presented herein.

FIG. 5 illustrates a diagram 500 of an example user device 102 capable of implementing aspects of the techniques and technologies presented herein. As shown, the user device 102 includes a client application 502 that is configured to output content of a file 504. For example, the client application 502 can include a text processing application, a presentation application, an image processing application, a video playing application, a video conferencing application, a browser configured to access and display web pages, and so forth. The user device 102 also includes the analysis module 110, the suggestion module 116, and the resolution resources 120, as described above with respect to FIG. 1. In various embodiments, the functionality performed by the analysis module 110 and the suggestion module 116 can be implemented within the client application 502 (e.g., the analysis module 110 and the suggestion module 116 are part of the client application 502) In other embodiments, the analysis module 110 and the suggestion module 116 are modules or components that are implemented separately from the client application 502, but can be called upon by the client application (e.g., via an API) to perform the disclosed techniques (e.g., detect a signal, associate the signal with content, determine a context of an issue, identify and suggest people capable of resolving the issue, etc.). In FIG. 5, the user device 102 includes local resolution resources 506 (e.g., resolution resources 120) that can be accessed or called upon (e.g., via an API). The local resolution resources 506 include local information useable to identified qualified people 508 (e.g., user communications, professional networks, social networks, work records/projects, etc.).

Figure 6:
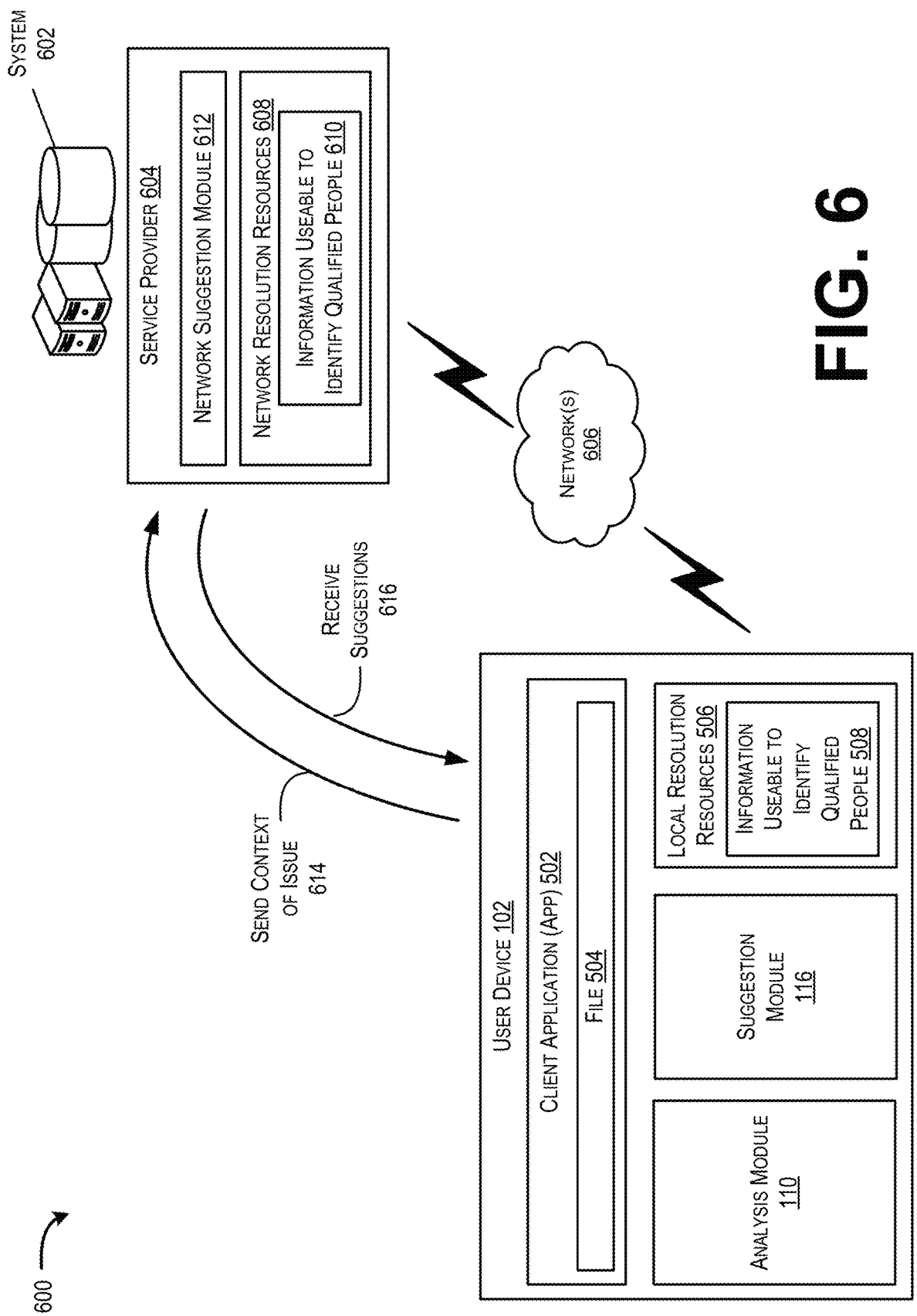
FIG. 6 illustrates a diagram of how an example user device and a service provider can communicate to implement aspects of the techniques and technologies presented herein.

FIG. 6 illustrates a diagram 600 of how an example user device 102 and a system 602 that hosts a service (e.g., a service provider 604) can communicate to implement aspects of the techniques and technologies presented herein. Similar to FIG. 5, the user device 102 of FIG. 6 includes the client application 502 that is configured to output content of a file 504, as well as the analysis module 110, the suggestion module 116, and the local resolution resources 506. However, in the example of FIG. 6, the user device can communicate with components of the service provider 604 over one or more network(s) 606 to access network resolution resources 608, which also include information useable to identified qualified people 610. Accordingly, the service provider 604 can include its own network suggestion module 612. To this end, the user device 102 can send 614 the context of the issue to the service provider 604 so that the network resolution resources 608 can be accessed, and in return, the user device 102 receives 616 one or more suggested people that are likely capable of providing assistance with regard to resolving the issue.

Figure 7:
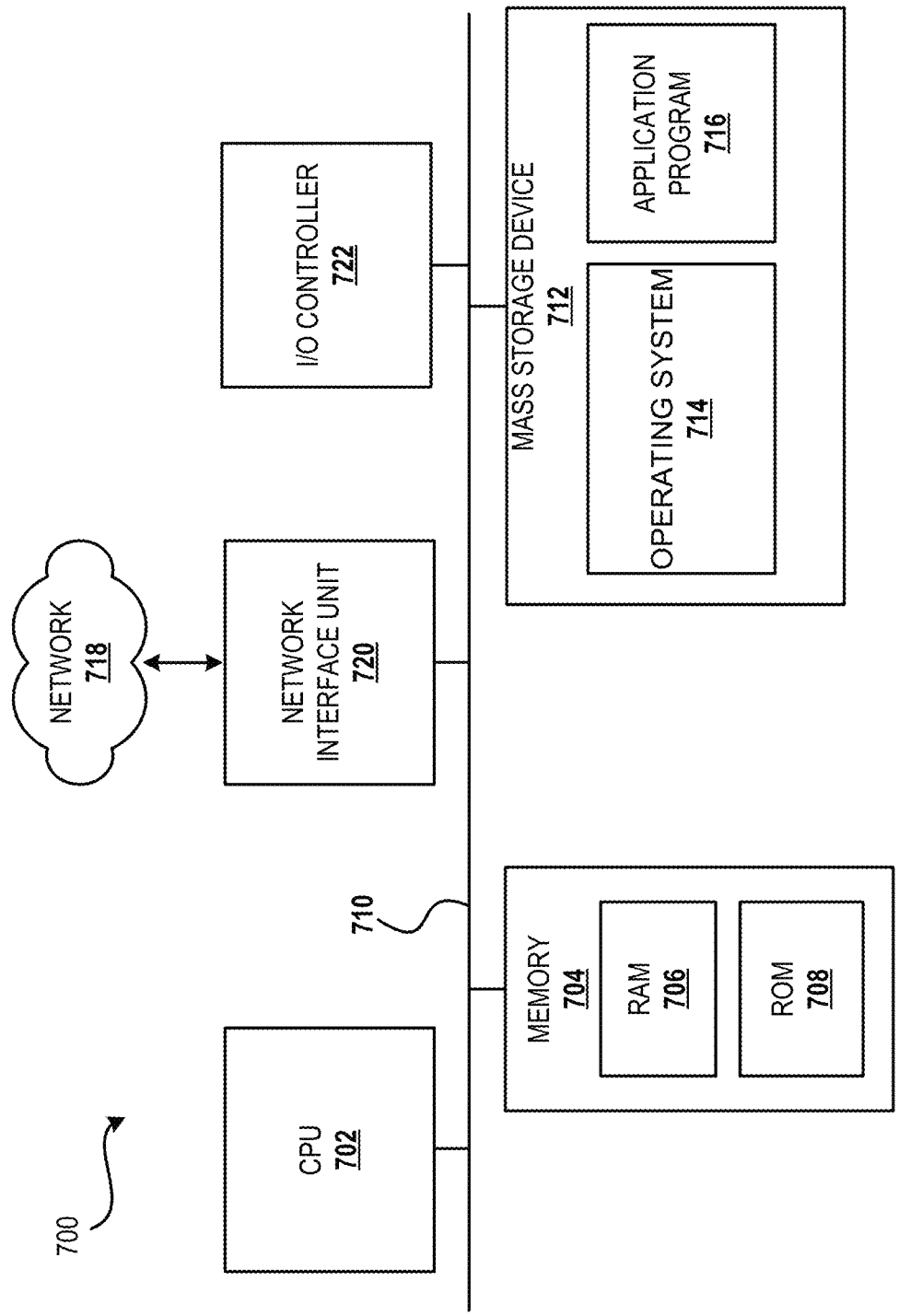
FIG. 7 is a computer architecture diagram illustrating an illustrative computer hardware and software architecture for a computing device and/or system capable of implementing aspects of the techniques and technologies presented herein.

FIG. 7 shows additional details of an example computer architecture 700 for a computer or a device (e.g., the user device 102 or a device of the system 602), capable of executing the techniques described herein. Thus, the computer architecture 700 illustrates an example architecture for a server computer, a mobile phone, a PDA, a smart phone, a desktop computer, a netbook computer, a tablet computer, and/or a laptop computer.

The computer architecture 700 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing an operating system 714 and one or more application programs 716 (e.g., executable to output content of a file).

The mass storage device 712 is connected to the CPU 702 through a mass storage controller connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 718. The computer architecture 700 may connect to the network 718 through a network interface unit 720 connected to the bus 710. It should be appreciated that the network interface unit 720 also may be utilized to connect to other types of networks and remote computer systems. The computer architecture 700 also may include an input/output controller 722 for receiving and processing input from a number of other devices, including a keyboard, mouse, or electronic stylus. Similarly, the input/output controller 722 may provide output to a display screen, a printer, or other type of output device.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding software modules to implement the techniques described herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Figure 8:
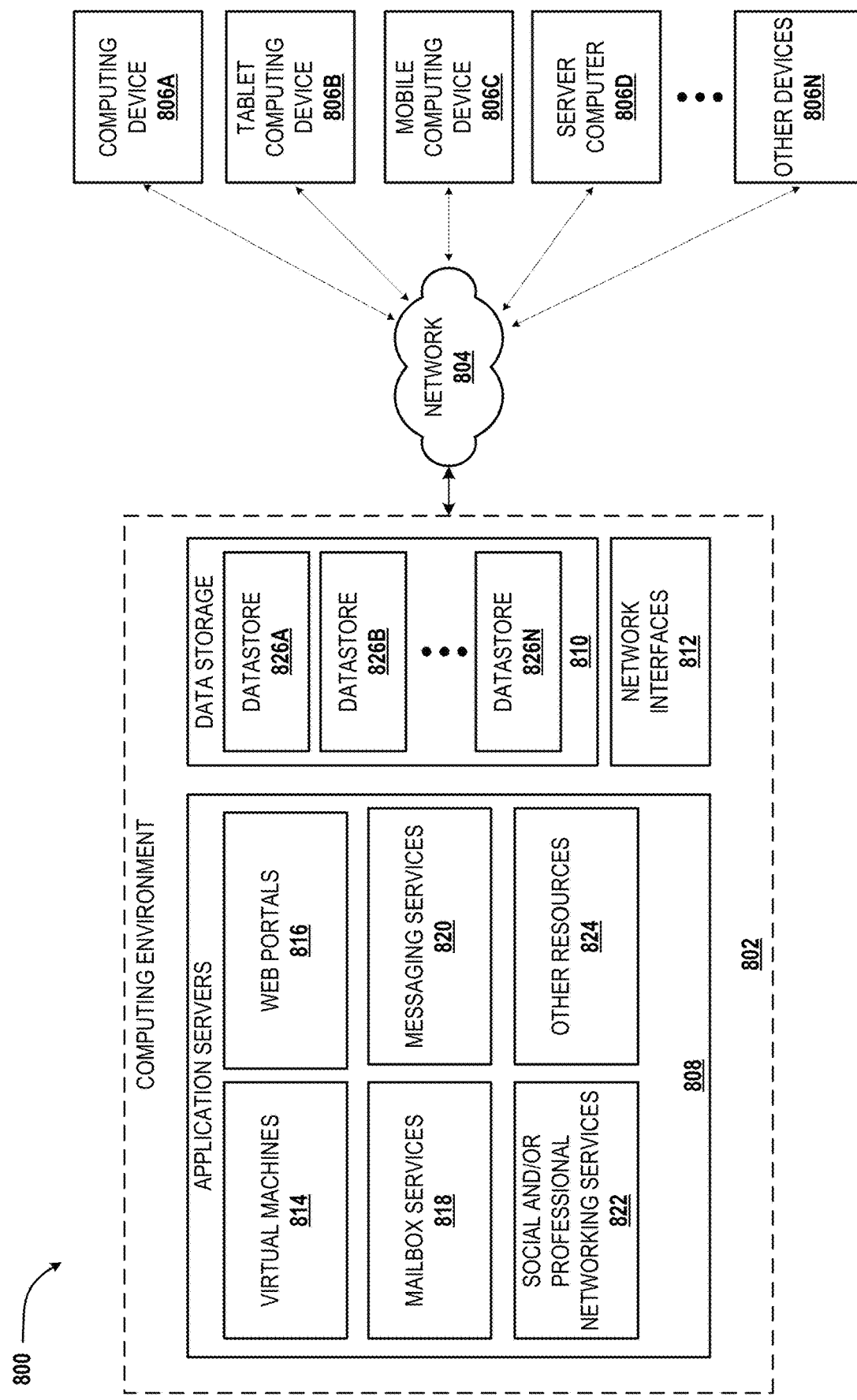
FIG. 8 is a diagram illustrating a distributed computing environment capable of implementing aspects of the techniques and technologies presented herein.

FIG. 8 depicts an illustrative distributed computing environment 800. According to various implementations, the distributed computing environment 800 includes a computing environment 802 operating on, in communication with, or as part of the network 804. The computing environment 802 can be associated with the system 602 of FIG. 6 and can be operated to provide a service. The network 804 may be or may include the network 718 and/or network(s) 606. The network 804 also can include various access networks. One or more client devices 806A-806N (hereinafter referred to collectively and/or generically as "clients 806" and also referred to herein as computing devices) can communicate with the computing environment 802 via the network 804 and/or other connections. In one illustrated configuration, the clients 806 include a computing device 806A such as a laptop computer, a desktop computer, or other computing device; a slate or tablet computing device ("tablet computing device") 806B; a mobile computing device 806C such as a mobile telephone, a smart phone, or other mobile computing device; a server computer 806D; and/or other devices 806N. It should be understood that any number of clients 806 can communicate with the computing environment 802. It should be understood that the illustrated clients 906 and computing architectures illustrated and described herein are illustrative, and should not be construed as being limited in any way. Each client 806 can be used to collect input signals and share them between different clients.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for enabling the generation of links and/or capabilities for a file, as described above. It should be understood that this configuration is illustrative, and should not be construed as being limiting in any way. The application servers 808 also host or provide access to one or more link pages or files, Web sites, and/or other information ("Web portals") 816.

According to various implementations, the application servers 808 also include one or more mailbox services 818 and one or more messaging services 820. The mailbox services 818 can include electronic mail ("email") services. The mailbox services 818 also can include various personal information management ("PIM") and presence services including, but not limited to, calendar services, contact management services, collaboration services, and/or other services. The messaging services 820 can include, but are not limited to, instant messaging services, chat services, forum services, and/or other communication services.

The application servers 808 also may include one or more social networking and/or professional networking services 822. The social and professional networking services 822 can include various social networking services including, but not limited to, services for sharing or posting status updates, instant messages, links, photos, videos, and/or other information including employment and education credentials and qualifications; services for commenting or displaying interest in articles, products, blogs, or other resources; and/or other services. In some configurations, the social and professional networking services 822 are provided by or include the FACEBOOK social networking service, the LINKEDIN professional networking service, the MYSPACE social networking service, the FOURSQUARE geographic networking service, the YAMMER office colleague networking service, and the like. In other configurations, the social and professional networking services 822 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social and professional networking services 822 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social and professional networking services 822 are not mentioned herein for the sake of brevity. As such, the above configurations are illustrative, and should not be construed as being limited in any way. According to various implementations, the social networking services 822 may host one or more applications and/or software modules for providing the functionality described herein, such as enabling the generation of content from multiple applications. For instance, any one of the application servers 808 may communicate or facilitate the functionality and features described herein. For instance, a social networking application, mail client, messaging client or a browser running on a phone or any other client 806 may communicate with a networking service 822 and facilitate the functionality, even in part, described above with respect to FIG. 8. Any device or service depicted herein can be used as a resource for supplemental data, including email servers, storage servers, etc.

As shown in FIG. 8, the application servers 808 also can host other services, applications, portals, and/or other resources ("other resources") 824. The other resources 824 can include, but are not limited to, document sharing, rendering or any other functionality. The other resources 824 can also include a machine learning engine for processing and generating historical user activity data. It thus can be appreciated that the computing environment 802 can provide integration of the concepts and technologies disclosed herein with various mailbox, messaging, social networking, and/or other services or resources.

As mentioned above, the computing environment 802 can include the data storage 810. According to various implementations, the functionality of the data storage 810 is provided by one or more databases operating on, or in communication with, the network 804. The functionality of the data storage 810 also can be provided by one or more server computers configured to host data for the computing environment 802. The data storage 810 can include, host, or provide one or more real or virtual datastores 826A-826N (hereinafter referred to collectively and/or generically as "datastores 826"). The datastores 826 are configured to host data used or created by the application servers 808 and/or other data. The datastores 826 also can host or store web page documents, text processing documents, presentation documents, data structures, algorithms for execution by a recommendation engine, and/or other data utilized by any application program or another module. Aspects of the datastores 826 may be associated with a service for storing files.

The computing environment 802 can communicate with, or be accessed by, the network interfaces 812. The network interfaces 812 can include various types of network hardware and software for supporting communications between two or more computing devices including, but not limited to, the computing devices and the servers. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 800 to utilize the functionality described herein for providing the techniques disclosed herein, among other aspects.

The disclosure presented herein may be considered in view of the following clauses.

Example Clause A, a method comprising: displaying content of a file; identifying a signal that has been added to the file, wherein the signal indicates an issue and the signal is added to the file based on user input; determining a portion of the content associated with the signal; outputting a query configured to determine whether a user consuming the content of the file desires assistance with regard to resolving the issue; receiving confirmation that the user consuming the content of the file desires the assistance with regard to resolving the issue; analyzing at least one of the portion of the content and the user input to determine a context of the issue; accessing one or more resolution resources to identify, based on the context of the issue, one or more persons that are qualified to provide the assistance with regard to resolving the issue; and outputting information that suggests the one or more persons, wherein the information is graphically associated with at least one of the portion of the content and the user input.

Example Clause B, the method of Example Clause A, wherein the issue comprises a question that is submitted via the user input as the user is consuming the file.

Example Clause C, the method of Example Clause B, further comprising monitoring for the signal in real-time as the user is consuming the file, wherein the signal comprises at least one of: a keyword or a key phrase associated with the portion of the content; a specific character associated with the portion of the content; a specific symbol or icon associated with the portion of the content; an alteration to a format of the portion of content; or a marker associated with the portion of the content.

Example Clause D, the method of any one of Example Clauses A through C, wherein the context of the issue comprises particular subject matter and the one or more persons that are qualified to provide the assistance with regard to resolving the issue have expertise related to the particular subject matter.

Example Clause E, the method of any one of Example Clauses A through D, wherein the one or more resolution resources comprise at least one of: professional profiles that are part of a professional network, social profiles that are part of a social network, employee profiles that are part of an enterprise network, communications previously sent or received by the user, or work products previously generated by the user or by a team of which the user is a part.

Example Clause F, the method of any one of Example Clauses A through E, further comprising prioritizing the one or more persons based on at least one of: a strength of a network relationship between the user and an individual person of the one or more persons, the strength of the network relationship being established based on number of levels of separation between the user and the individual person in a professional network or a social network; a strength of a working relationship between the user and an individual person of the one or more persons, the strength of the working relationship being established based on a number of times the user and the individual person have communicated with one another or a number of times the user and the individual person have worked on a project together; or physical proximity of a location of an individual person of the one or more persons to a location of the user.

Example Clause G, the method of any one of Example Clauses A through F, wherein the information comprises considerations used to qualify the one or more persons as candidates to provide the assistance with regard to resolving the issue.

Example Clause H, the method of any one of Example Clauses A through G, wherein the information comprises selectable elements that, upon activation, enables the user to communicate with an individual person of the one or more persons.

Example Clause I, the method of any one of Example Clauses A through H, further comprising outputting a prompt requesting confirmation that the context of the issue is correct, wherein the one or more resolution resources are accessed in response to receiving the confirmation that the context of the issue is correct.

Example Clause J, the method of any one of Example Clauses A through I, wherein the signal being monitored for is predefined for a type of the file.

While the subject matter of Example Clauses A through J is described above with respect to a method, it is understood in the context of this disclosure that the subject matter of Example Clauses A through J can be implemented by a device, a system, or via computer-readable storage media.

Example Clause K, a device comprising: one or more processing units; and a computer-readable medium having encoded thereon computer-executable instructions to cause the one or more processing units to: output content of a file; identify, based on user input received while the content of the file is being output, a signal that indicates an issue; determine a portion of the content associated with the signal; analyze at least one of the portion of the content and the user input to determine a context of the issue; access one or more resolution resources to identify, based on the context of the issue, one or more persons that are likely capable of providing assistance with regard to resolving the issue; and output information that suggests the one or more persons.

Example Clause L, the device of Example Clause K, wherein the computer-executable instructions further cause the one or more processing units to: output a query configured to determine whether a user consuming the content of the file desires the assistance with regard to resolving the issue; and receive confirmation that the user consuming the content of the file desires the assistance with regard to resolving the issue.

Example Clause M, the device of Example Clause K or Example Clause L, wherein the issue comprises a question that is submitted via the user input as a user is consuming the file.

Example Clause N, the device of any one of Example Clauses K through M, wherein the signal comprises at least one of: a keyword or a key phrase associated with the portion of the content; a specific character associated with the portion of the content; a specific symbol or icon associated with the portion of the content; an alteration to a format of the portion of content; or a marker associated with the portion of the content.

Example Clause O, the device of any one of Example Clauses K through N, wherein the context of the issue comprises particular subject matter and the one or more persons that are likely capable of providing assistance with regard to resolving the issue have qualifications related to the particular subject matter.

Example Clause P, the device of any one of Example Clauses K through O, wherein the one or more resolution resources comprise at least one of: professional profiles that are part of a professional network, social profiles that are part of a social network, employee profiles that are part of an enterprise network, communications previously sent or received by a user consuming the content, or work products previously generated by the user or by a team of which the user is a part.

Example Clause Q, the device of any one of Example Clauses K through P, wherein the computer-executable instructions further cause the one or more processing units to prioritize the one or more persons based on at least one of: a strength of a network relationship between a user consuming the content and an individual person of the one or more persons, the strength of the network relationship being established based on number of levels of separation between the user and the individual person in a professional network or a social network; a strength of a working relationship between a user consuming the content and an individual person of the one or more persons, the strength of the working relationship being established based on a number of times the user and the individual person have communicated with one another or a number of times the user and the individual person have worked on a project together; or physical proximity of a location of an individual person of the one or more persons to a location of a user consuming the content.

Example Clause R, the device of any one of Example Clauses K through Q, wherein the information comprises considerations used to qualify the one or more persons as candidates to provide the assistance with regard to resolving the issue.

Example Clause S, the device of any one of Example Clauses K through R, wherein the information comprises selectable elements that, upon activation, enables a user consuming the content to communicate with an individual person of the one or more persons.

While the subject matter of Example Clauses K through S is described above with respect to a device, it is understood in the context of this disclosure that the subject matter of Example Clauses K through S can be implemented via a method or via computer-readable storage media.

Example Clause T, a device comprising: one or more processing units; and a computer-readable medium having encoded thereon computer-executable instructions to cause the one or more processing units to: output content of a file; identify, based on user input received while the content of the file is being output, a signal that indicates an issue; determine a portion of the content associated with the signal; analyze at least one of the portion of the content and the user input to determine a context of the issue; send the context of the issue to a service provider that has access to one or more resolution resources that store information useable to identify, based on the context of the issue, one or more persons that are likely capable of providing assistance with regard to resolving the issue; receive the one or more persons from the service provider; and output information that suggests the one or more persons.

While the subject matter of Example Clause T is described above with respect to a device, it is understood in the context of this disclosure that the subject matter of Example Clause T can be implemented via a method or via computer-readable storage media.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
displaying content of a file;
monitoring, using one or more processing units of a device and as a user is consuming the file, for a signal that indicates an issue with a portion of the content of the file, wherein the signal comprises at least one of a specific character that indicates the issue, a specific symbol that indicates the issue, a specific keyword that indicates the issue, a specific icon that indicates the issue, or a change in content format that indicates the issue;
determining that the signal has been inserted at a location within the file;
determining a portion of the content of the file that corresponds to the location within the file where the signal has been inserted;
outputting a query configured to determine whether the user consuming the content of the file desires assistance with regard to resolving the issue;

receiving, in response to the outputting of the query, confirmation that the user consuming the content of the file desires the assistance with regard to resolving the issue;

analyzing, using natural language processing, the portion of the content of the file;

determining, based at least in part on the analyzing, a topic described by the portion of the content of the file;

accessing at least one resolution resource, wherein the at least one resolution resource comprises at least one of: professional profiles that are part of a professional network of the user consuming the content of the file, social profiles that are part of a social network of the user consuming the content of the file, employee profiles that are part of an enterprise network of the user consuming the content of the file, or communications previously sent or received via a communications account of the user;

identifying, using the at least one resolution resource and based on the topic described by the portion of the content of the file, at least one person that is qualified to provide the assistance with regard to resolving the issue; and outputting information that identifies the at least one person, wherein the information is graphically associated with the portion of the content of the file.

2. The method of claim 1, wherein the issue comprises a question that is submitted via the user input as the user is consuming the file.

3. The method of claim 1, wherein the at least one person that is qualified to provide the assistance with regard to resolving the issue has expertise related to the topic described by the portion of the content of the file.

4. The method of claim 1, wherein the at least one person comprises a plurality of persons, the method further comprising prioritizing the plurality of persons based on a strength of a network relationship between the user and an individual person of the plurality of persons, the strength of the network relationship being established based on number of levels of separation between the user and the individual person in one of the professional network, the social network, or the enterprise network.

5. The method of claim 1, wherein the information comprises considerations used to qualify the at least one person as a candidate to provide the assistance with regard to resolving the issue.

6. The method of claim 1, wherein the information comprises selectable elements that, upon activation, enables the user to communicate with the at least one person.

7. The method of claim 1, further comprising outputting a prompt requesting confirmation that the topic described by the portion of the content of the file is correct, wherein the at least one resolution resource is accessed in response to receiving the confirmation that the topic described by the portion of the content of the file is correct.

8. The method of claim 1, wherein the signal being monitored for is predefined for a type of the file.

9. A device comprising:
one or more processing units; and
a computer-readable medium having encoded thereon computer-executable instructions to cause the one or more processing units to:
output content of a file;
monitor, as a user is consuming the file, for a signal that indicates an issue with a portion of the content of the file, wherein the signal comprises at least one of a specific character that indicates the issue, a specific symbol that indicates the issue, a specific keyword that indicates the issue, a specific icon that indicates the issue, or a change in content format that indicates the issue;

determine, based on user input received while the content of the file is being output, that the signal has been inserted at a location within the file;

determine a portion of the content of the file that corresponds to the location within the file where the signal has been inserted;

analyze, using natural language processing, the portion of the content of the file;

determine, based at least in part on the analyzing, a topic described by the portion of the content of the file;

access at least one resolution resource, wherein the at least one resolution resource comprises at least one of: professional profiles that are part of a professional network of the user consuming the content of the file, social profiles that are part of a social network of the user consuming the content of the file, employee profiles that are part of an enterprise network of the user consuming the content of the file, or communications previously sent or received via a communications account of the user;

identify, using the at least one resolution resource and based on the topic described by the portion of the content of the file, at least one person that is likely capable of providing assistance with regard to resolving the issue; and output information that identifies the at least one person.

10. The device of claim 9, wherein the computer-executable instructions further cause the one or more processing units to:
output a query configured to determine whether the user consuming the content of the file desires the assistance with regard to resolving the issue; and
receive, in response to the outputting of the query, confirmation that the user consuming the content of the file desires the assistance with regard to resolving the issue.

11. The device of claim 9, wherein the issue comprises a question that is submitted via the user input as the user is consuming the file.

12. The device of claim 9, wherein: the at least one person that is likely capable of providing assistance with regard to resolving the issue has qualifications related to the topic described by the portion of the content of the file.

13. The device of claim 9, wherein the at least one person comprises a plurality of persons, and the computer-executable instructions further cause the one or more processing units to prioritize the the plurality of persons based on a strength of a network relationship between the user consuming the content and an individual person of the plurality of persons, the strength of the network relationship being established based on number of levels of separation between the user and the individual person in the professional network, the social network, or the enterprise network.

14. The device of claim 9, wherein the information comprises considerations used to qualify the at least one person as a candidate to provide the assistance with regard to resolving the issue.

15. The device of claim 9, wherein the information comprises selectable elements that, upon activation, enables the user consuming the content to communicate with the at least one person.

16. A device comprising:
one or more processing units; and
a computer-readable medium having encoded thereon computer-executable instructions to cause the one or more processing units to:
output content of a file;
monitor, as a user is consuming the file, for a signal that indicates an issue with a portion of the content of the file, wherein the signal comprises at least one of a specific character that indicates the issue, a specific symbol that indicates the issue, a specific keyword that indicates the issue, a specific icon that indicates the issue, or a change in content format that indicates the issue;
determine, based on user input received while the content of the file is being output, that the signal has been inserted at a location within the file;
determine a portion of the content of the file that corresponds to the location within the file where the signal has been inserted;
analyze, using natural language processing, the portion of the content of the file;
determine, based at least in part on the analyzing, a topic described by the portion of the content of the file;
send the topic described by the portion of the content of the file to a service provider that has access to at least one resolution resource that stores information useable to identify, based on the topic described by the portion of the content of the file, at least one person that is likely capable of providing assistance with regard to resolving the issue, wherein the at least one resolution resource comprises at least one of: professional profiles that are part of a professional network of the user consuming the content of the file, social profiles that are part of a social network of the user consuming the content of the file, employee profiles that are part of an enterprise network of the user consuming the content of the file, or communications previously sent or received via a communications account of the user;
receive an identity of the at least one person from the service provider; and
output the identity of the at least one person.

17. The method of claim 1, wherein the at least one person comprises a plurality of persons, the method further comprising prioritizing the plurality of persons based on a strength of a working relationship between the user and an individual person of the plurality of persons, the strength of the working relationship being established based on a number of times the user and the individual person have communicated with one another or a number of times the user and the individual person have worked on a project together.

18. The device of claim 9, wherein the at least one person comprises a plurality of persons, and the computer-executable instructions further cause the one or more processing units to prioritize the plurality of persons based on a strength of a working relationship between the user and an individual person of the plurality of persons, the strength of the working relationship being established based on a number of times the user and the individual person have communicated with one another or a number of times the user and the individual person have worked on a project together.

19. The device of claim 16, wherein the at least one person comprises a plurality of persons, and the computer-executable instructions further cause the one or more processing units to prioritize the plurality of persons based on a strength of a network relationship between the user consuming the content and an individual person of the plurality of persons, the strength of the network relationship being established based on number of levels of separation between the user and the individual person in the professional network, the social network, or the enterprise network.

20. The device of claim 16, wherein the at least one person comprises a plurality of persons, and the computer-executable instructions further cause the one or more processing units to prioritize the plurality of persons based on a strength of a working relationship between the user and an individual person of the plurality of persons, the strength of the working relationship being established based on a number of times the user and the individual person have communicated with one another or a number of times the user and the individual person have worked on a project together.

* * * * *